Sept. 15, 1970 J. W. BIRD 3,528,731
MOVIE TITLER, CLAP-BOARD STYLE
Filed Aug. 28, 1967
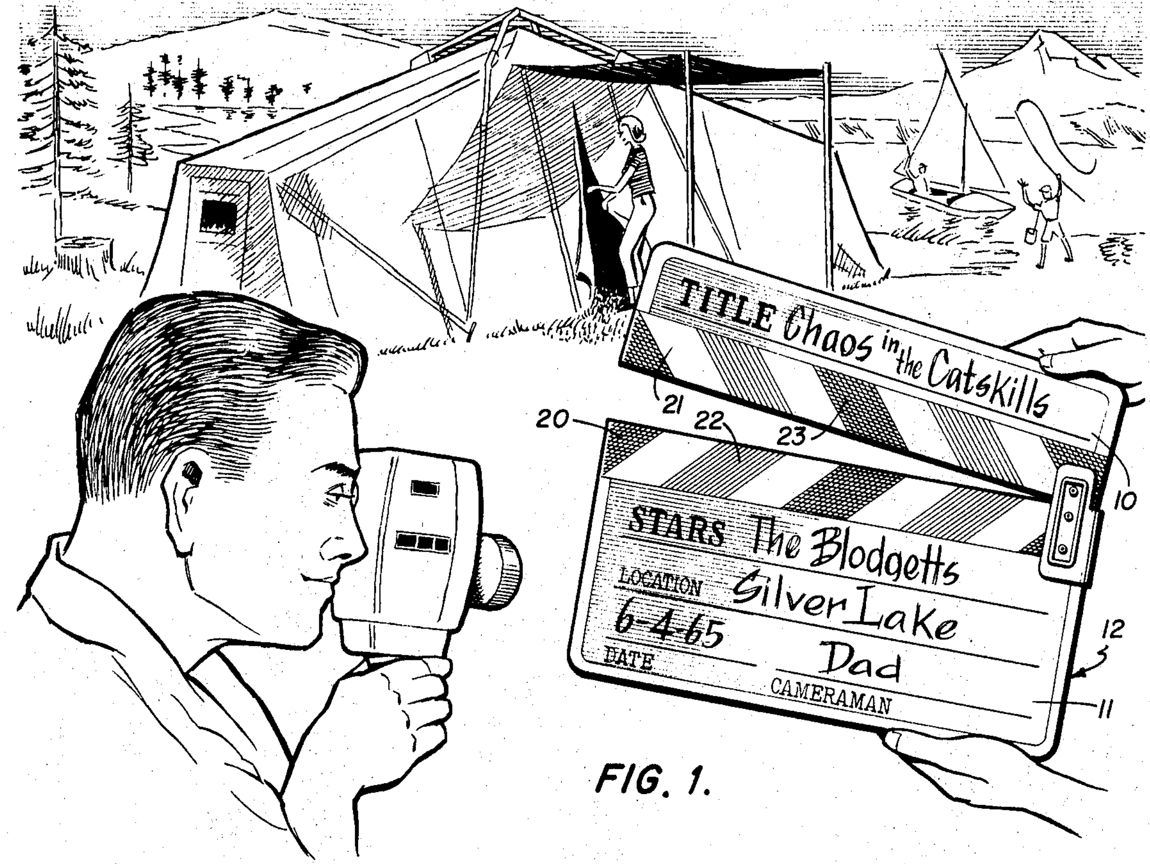
FIG. 1.
FIG. 2.
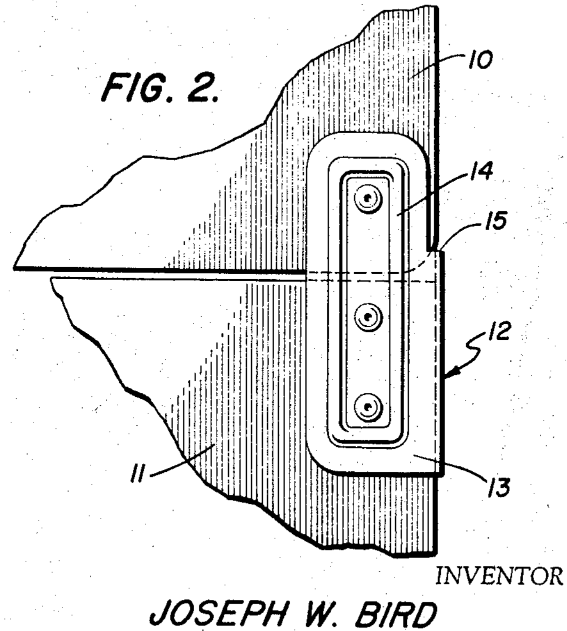
FIG. 3.
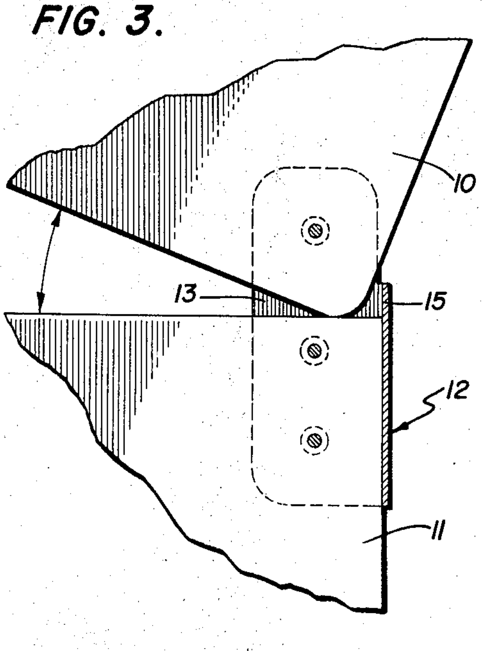
INVENTOR
JOSEPH W. BIRD
BY
ATTORNEY United States Patent Office 3,528,731
Patented Sept. 15, 1970

1

3,528,731

MOVIE TITLER, CLAP-BOARD STYLE

Joseph W. Bird, 11 Briarcliff Lane, Paxton, Mass. 01612

Filed Aug. 28, 1967, Ser. No. 663,879
Int. Cl. G03b *21/32*
U.S. Cl. 352—90 4 Claims

ABSTRACT OF THE DISCLOSURE

A movie titler of the type having two hinged parts that can be clapped together to indicate the beginning of a scene. The hinge between the parts is constructed as two parallel spaced flanges between which the parts are mounted to provide good action by providing a pivot point for the clapper portion spaced away from the fixed portion.

BACKGROUND OF THE INVENTION

The amateur and professional photographer, after exposing a film, usually must send it away to be processed. Sometimes, as on a vacation, when the days tend to blend into one another, in order to keep a proper record of the sequence of taking the pictures, it is necessary to prepare titles for exposure with each different scene or at least with each day's picture taking efforts or subsequently it may be difficult to splice the various sections of the films together in a proper sequence because of a faulty remembrance.

When touring, it is difficult to prepare title signs in advance, and if titles are not available, an attempt is made to find an object which will identify the shot and remind the photographer of the sequence. The latter is sometimes time consuming and inconvenient. The present invention has been made to provide the amateur and professional movie maker with a new stool to fill this need, most specifically, for movies but also for still picture taking.

BRIEF DESCRIPTION OF THE INVENTION

Very simply my invention provides a board with a hinged element that may be operated to make a clapping sound. This serves to warn all present that picture taking is in progress so that they can be attentive to the action desired, thereby avoiding waste of film footage. Also, since sound film equipment is now available to amateurs and will shortly be inexpensive enough for all moviemakers to have, the clapping sound is useful in matching action to sound in final editing of the processed films.

In addition, my invention is provided with color indices of known intensities and colors to provide the photographer with a color quality checking device to compare his processed films with the true colors whereby to learn how to maximize the color reproduction in his films. The device also has a "blackboard" type of surface to receive data printed thereon to identify the scene for example, by date, name of photographer, place, persons in the scene, etc.

THE DRAWINGS

FIG. 1 is a perspective view showing my movie titler in use;

FIG. 2 is a view of the hinge construction for the noise maker, showing the clap-board partly broken away and in closed position; and FIG. 3 is a rear view of the hinge structure of FIG. 2 showing the clap-board in open position.

DETAIL DESCRIPTION

The movie titler here shown is made in two generally flat or planar parts 10 and 11 that are hinged together in a common plane with the stiff hinge structure 12 mounted

2 on the base 11. The hinge 12 is best seen in FIGS. 2 and 3 and includes a generally flat front face 13 that may be stiffened with a slightly raised bead 14 stamped therein. Integral with the face 13 is a rearwardly turned flange 15 that serves to further stiffen the hinge means. The flange 15 nests along the side of base member 11 to hold the hinge rigid therewith and, as best shown in FIG. 3, extends upwardly slightly above the edge thereof. The hinge 12 is riveted to the bottom element 11 of the titler to support the hinged element 10 in a planar relationship to element 11. The element 10 is carried by the hinge to have a controlled degree of swing as shown in FIG. 3 whereby element 10 may be first lifted as shown in FIG. 1 and then swung about the pivot of the hinge to be guided back into contact with element 11, to provide a sharp crack when snapped back rapidly. This action provides the necessary "clap" to warn all in the vicinity that picture taking is commencing.

The hingedly connected elements 10 and 11 are provided with various indicia on their front flat faces for exposure to the camera, included are several color stripes 20, 21, 22, and 23. These stripes are produced in any desired pattern, but as here shown, form a chevron design when 10 is snapped shut on 11. These color swatches are preferably produced in the primary colors so that, when the film is ultimately developed, the photographer can check his exposure technique to make sure that he has used the correct filters, lighting and timing. The chevron design is particularly desirable, since it not only may be used for color reference purposes, but also to show the sharpness of the focus at the meeting lines of the angularly disposed color swatches.

Other indicia include a surface laid out with various title information including such data as cameraman, title of the scene, date, etc. This portion of the titler has a characteristic that enables it to be written on with chalk that may subsequently be easily erased. It is apparent that the necessary data to identify the scene, time, actors, or other information can be written on the titler and exposed on the film at the start of the picture taking.

The use of my itler is rather obvious from an inspection of FIG. 1. The cameraman inserts the desired data on the face of the clap-board and when all is in readiness, he has an assistant hold the board in front of the camera to be exposed to the film. When a proper exposure has been accomplished, the cameraman signals his assistant who then snaps 10 downwardly to clap loudly against 11. All actors in the vicinity then know that picture taking is in progress and that they should do as directed.

After the film has been fully exposed and developed, the cameraman will have a permanent record of the scene, date, etc., recorded integrally with the film. At some future time, it will be easy for the photographer to identify the people who appeared in his film, whose names would undoubtedly otherwise be difficult to recall or lost forever.

In addition to recording such data, the color chart on the face of the titler provides a most useful reference means. With consistent use, the amateur can compare his actual exposure settings against the color actually recorded so that he can make suitable adjustments in his techniques to always expose his film to get the scenes on record with maximum fidelity. The chevron design, as explained above, provides a swinging motion device to check the sharpness of focus. Should the photographer feel certain that his techiques are correct and that his equipment is in proper working order but that the results continue to be of poor quality, when checked against the primary colored chevron design, he may then conclude that this particular processing laboratory is not offering good quality processing and he may wish to try another source of service for his films.

With the structure described above, I provide a titler having a built-in clapping device coupled with the use of the face of the clap-board to record suitable data for future reference. The above description comprehends the preferred form of my invention; however, it is suggested that many modifications thereof may occur to those skilled in the art which will fall within the scope of the following claims.

I claim:

1. A titler and clap-board for photographers, comprising (a) a wide flat rectangular base portion, (b) a flat rectangular hinged portion normally lying in the plane of the base portion with one edge lying against an edge of the base portion, (c) a hinge consisting of two parallel spaced plates between which adjacent corners of the two portions lie, the plates being fixedly fastened to the corner of the base portion, (d) a pivot pin extending between the hinge plates and through the corner of the hinged portion, the said corner of the hinged portion being provided with a circular edge at least a portion of which is a greater distance from the pivot pin than the distance from the pivot pin to the said edge of the base portion.

2. The structure of claim 1 wherein said titler carries a color chart for exposure reference purposes.

3. The structure of claim 2 wherein said color reference chart is in the form of a chevron design whereby to provide a reference for color and for sharpness of focus.

4. The structure of claim 1 wherein the flat faces of said base element and said hinged element are provided with surfaces to receive data printed thereon that may be easily erased.

References Cited

UNITED STATES PATENTS 2,303,181 11/1942 Thomas ............. 352—24

OTHER REFERENCES

Soc. of Motion Picture & Television Engineers—Journal, vol. 64, No. 3, March 1955, page 152, "Camart Slate and Clapstick."

NORTON ANSHER, Primary Examiner

R. A. WINTERCORN, Assistant Examiner

U.S. Cl. X.R.

40—28; 95—1.1; 116—114; 352—244